United States Patent
Deng et al.

(10) Patent No.: US 6,485,786 B2
(45) Date of Patent: Nov. 26, 2002

(54) AQUEOUS STAIN-BLOCKING COATING COMPOSITION

(75) Inventors: Hai Deng, Downingtown, PA (US); Kirti Deshmukh, Warminster, PA (US); Aurelia de la Cuesta Sheppard, Newtown, PA (US); Mark Robert Winkle, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/833,011

(22) Filed: Apr. 10, 2001

(65) Prior Publication Data

US 2002/0004552 A1 Jan. 10, 2002

Related U.S. Application Data

(60) Provisional application No. 60/199,889, filed on Apr. 26, 2000.

(51) Int. Cl.$^7$ ................................ B05D 3/02
(52) U.S. Cl. .................................. 427/385.5
(58) Field of Search .............................. 427/384, 385.5

(56) References Cited

U.S. PATENT DOCUMENTS

| | | | |
|---|---|---|---|
| 4,101,490 A | 7/1978 | Pons et al. | 260/29.6 |
| 4,110,285 A | 8/1978 | Pons et al. | 260/29.6 |
| 4,487,859 A | 12/1984 | Martino | 523/406 |
| 4,812,510 A | 3/1989 | Barnett et al. | 524/807 |
| 4,891,401 A | 1/1990 | Huybrechts et al. | 524/807 |
| 5,191,029 A | 3/1993 | DelDonno | 525/366 |
| 5,286,778 A | 2/1994 | Dean et al. | 524/460 |
| 5,395,436 A | 3/1995 | Setzke | 106/34 |
| 5,527,619 A | 6/1996 | Rokowski et al. | 428/452 |
| 5,922,410 A | 7/1999 | Swartz et al. | 427/393 |
| 5,922,777 A * | 7/1999 | Van Rheenen | 521/28 |

FOREIGN PATENT DOCUMENTS

| | | |
|---|---|---|
| BE | 765.300 | 10/1971 |
| DE | 195 14 266 A1 | 10/1996 |
| DE | 198 45 999 A1 | 4/2000 |
| DE | 199 17 235 A1 | 10/2000 |
| EP | 0 221 498 A2 | 5/1987 |
| EP | 0 562 730 A1 | 9/1993 |
| EP | 0 612 771 A1 | 8/1994 |
| EP | 0622 427 A2 | 11/1994 |
| EP | 0 764 666 A2 | 3/1997 |
| EP | 0 778 296 A1 | 6/1997 |
| EP | 0 837 110 A1 | 4/1998 |
| EP | 0960 919 A1 | 12/1999 |
| GB | 958856 | 6/1962 |
| WO | WO 91/02775 | 3/1991 |
| WO | WO 92/07131 * | 4/1992 |

* cited by examiner

*Primary Examiner*—Erma Cameron
(74) *Attorney, Agent, or Firm*—Ronald D. Bakule

(57) ABSTRACT

An aqueous stain-blocking coating composition including an aqueous emulsion copolymer having a glass transition temperature (Tg) from −20° C. to 60° C. and including, as polymerized units, at least one ethylenically unsaturated nonionic monomer and 1.5–6%, by weight based on the dry weight of the copolymer, ethylenically unsaturated strong acid monomer, such as a Phosphorous-containing strong acid monomer, or salts thereof is provided. Also provided is a method for blocking stains by applying the aqueous stain-blocking coating composition to a substrate bearing a stain; and drying, or allowing to dry, the aqueous composition.

4 Claims, No Drawings

AQUEOUS STAIN-BLOCKING COATING COMPOSITION

CROSS REFERENCE TO RELATED PATENT APPLICATIONS

This is a non-provisional application of prior pending U.S. provisional application serial No. 60/199,889 filed Apr. 26, 2000.

This invention relates to an aqueous composition suitable for use as a stain-blocking coating and a method for blocking stains, particularly marker stains, by coating a substrate with the aqueous stain-blocking coating composition. More particularly this invention relates to an aqueous composition suitable for use as a stain-blocking coating including an aqueous emulsion copolymer, the copolymer having a glass transition temperature (Tg) from −20° C. to 60° C., and the copolymer including as polymerized units at least one ethylenically unsaturated nonionic monomer and 1.5–6%, by weight based on the dry weight of the copolymer, ethylenically unsaturated strong acid monomer, or salts thereof.

The present invention serves to provide an aqueous composition suitable for use, when dry, as a stain-blocking coating. By stain-blocking coating herein is meant a coating disposed between a stain-bearing substrate and a later-applied aqueous coating which minimizes or eliminates the tendency of stains on a substrate such as, for example, markings made by pens or marking devices on a wall to migrate through a later-applied aqueous coating and appear on the surface of the dry later-applied coating as discolored area or markings.

U.S. Pat. No. 4,812,510 discloses colloid-free vinyl acetate latexes which include up to 15 weight parts of an ionic comonomer such as sodium styrene sulfonate, sodium vinyl sulfonate, and mono- and di-phosphated hydroxyethyl methacrylate and are prepared with up to 20 weight parts of certain anionic surfactants including phosphates and sulfonates for use in a variety of adhesives and coatings. But the use of the latexes in stain-blocking coating compositions is not disclosed.

U.S. Pat. No. 5,922,410 discloses in clear (unpigmented) wood coating compositions including a copolymer containing 0.1 to 50 wt. % of a copolymerized monomer containing a conjugate base of an acid, the acid having a pKa of less than 4 for use in clear coatings to enhance the yellowness (warmth) of the wood to which it is applied. But the use of the copolymers in stain-blocking coating compositions is not disclosed.

The problem faced by the inventors is the provision of an aqueous composition suitable for use as a stain-blocking coating and a method for blocking stains, particularly marker stains, by coating a substrate with the aqueous stain-blocking coating composition before the application of an additional coating. Unexpectedly, the inventors found that the aqueous compositions of this invention containing a selected amount of copolymerized strong acid monomers, or the salts thereof, were highly effective in blocking stains, particularly marker stains.

In a first aspect of the present invention there is provided an aqueous stain-blocking coating composition including an aqueous emulsion copolymer, the copolymer having a glass transition temperature (Tg) from −20° C. to 60° C., the copolymer including as polymerized units at least one ethylenically unsaturated nonionic monomer and 1.5–6%, by weight based on the dry weight of the copolymer, ethylenically unsaturated strong acid monomer, or salts thereof In a second aspect of the present invention there is provided a method for blocking stains including forming an aqueous coating composition including an aqueous emulsion copolymer, the copolymer having a glass transition temperature (Tg) from −20° C. to 60° C., and the copolymer including, as polymerized units, at least one ethylenically unsaturated nonionic monomer and 1.5–6%, by weight based on the dry weight of the copolymer, ethylenically unsaturated strong acid monomer, or salts thereof; applying the aqueous composition to a substrate bearing a stain; and drying, or allowing to dry, the aqueous composition.

This invention relates to an aqueous composition suitable for use as a stain-blocking coating. As a stain-blocking coating, when dry, it is intended to prevent the migration of stains so that a later-applied aqueous coating, when dry, will provide an aesthetically pleasing appearance with minor visible or no stains on the surface of the later-applied coating. Alternatively, one skilled in the art might describe the stain-blocking coating as a stain-blocking primer or a stain-locking primer.

The aqueous stain-blocking coating composition contains an aqueous emulsion copolymer, the copolymer having a glass transition temperature (Tg) from −20° C. to 60° C., and the copolymer including as copolymerized units at least one ethylenically unsaturated nonionic monomer and 1.5–6%, by weight based on the dry weight of the polymer, ethylenically unsaturated strong acid monomer, or salts thereof.

The aqueous emulsion copolymer includes at least one copolymerized ethylenically unsaturated nonionic monomer. By "nonionic monomer" herein is meant that the copolymerized monomer residue does not bear an ionic charge between pH=1–14. The ethylenically unsaturated nonionic monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth) acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate and other vinyl esters; and vinyl monomers such as vinyl chloride, vinylidene chloride. Preferred are all-acrylic, predominantly acrylic, styrene/acrylic, and vinyl acetate/acrylic copolymers.

The emulsion copolymer contains 1.5–6%, by weight based on the dry weight of the copolymer, copolymerized ethylenically unsaturated strong acid monomer, or salts thereof. By "ethylenically unsaturated strong acid monomer" herein is meant a monomer bearing a pendant acid group having a pKa (in water at 20 C.) less than 4, or a salt thereof. Strong acid monomers include, for example, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate. Preferred are Phosphorous-containing strong acid monomers. It is also contemplated that the copolymerized ethylenically unsaturated strong acid monomer may be formed after the polymerization of at least one ethylenically unsaturated nonionic monomer and a strong acid precursor monomer by effecting the reaction of the copolymerized strong acid precursor monomer so as to convert it to a copolymerized strong acid monomer; for example a polymer containing, as a polymerized unit, hydroxyethyl methacrylate which may then be reacted, as is well known in the art, to form, for example, sulfoethyl methacrylate or phosphoethyl methacrylate.

The emulsion copolymer may contain from 0 to 5%, by weight based on the dry weight of the copolymer, copolymerized ethylenically unsaturated carboxylic acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, and maleic anhydride. Preferred is 0–1% copolymerized ethylenically unsaturated carboxylic acid monomer.

The emulsion copolymer may contain from 0% to 5%, by weight based on the dry weight of the copolymer, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. Preferred is the use of no copolymerized multi-ethylenically unsaturated monomers.

The glass transition temperature ("Tg") of the emulsion copolymer is from −20° C. to 60° C. Tgs used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(\text{calc.}) = w(M1)/Tg(M1) + w(M2)/Tg(M2), \text{ wherein}$$

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in °K.

The glass transition temperatures of homopolymers may be found, for example, in "Polymer Handbook", edited by J. Brandrup and E. H. Immergut, Interscience Publishers.

The polymerization techniques used to prepare aqueous emulsion-copolymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100 C. throughout the course of the reaction. Preferred is a reaction temperature between 30 C. and 95 C., more preferably between 50 C. and 90 C. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans may be used to lower the molecular weight of the emulsion polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage. The use of chain transfer agent in the amount of 0 to 5 wt %, based on the total weight of monomer used to form the aqueous emulsion copolymer is effective to provide a GPC weight average molecular weight of 1000 to 5,000,000. Preferred is the use of 0 to 1 wt % chain transfer agent, based on the total weight of monomer used to form the aqueous emulsion copolymer; more preferred is the use of 0.1% to 0.5 wt % chain transfer agent, based on the total weight of monomer used to form the aqueous emulsion copolymer.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, for a multi-staged polymer particle the amount of strong acid monomer shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373. A preferred multistage emulsion polymer contains strong acid monomer is only one of the stages.

The average particle diameter of the emulsion copolymer particles is preferred to be from 30 nanometers to 500 nanometers, as measured by a BI-90 Particle Sizer.

In an alternative embodiment of this invention the aqueous stain-blocking coating composition is contemplated to include pigments and/or fillers such as, for example, titanium dioxide, iron oxide, zinc oxide, magnesium silicate, calcium carbonate, organic and inorganic colored pigments, and clay. Such pigmented coating compositions preferably contain from 3 to 70% pigment on a volume basis, more preferably from 15 to 60% titanium dioxide on a volume basis.

The aqueous stain-blocking coating composition of this invention is contemplated to encompass coating or paint compositions which may be described in the art as clear coatings, flat coatings, satin coatings, semi-gloss coatings, gloss coatings, primers, textured coatings, and the like. It is also contemplated that the aqueous stain-blocking coating composition of this invention may be used as the later-applied coating described herein, i.e., that the same or a different stain-blocking coating may be used as a topcoat as well as being applied directly over the stain-bearing substrate. The aqueous stain-blocking coating composition is prepared by techniques which are well known in the coatings art. First, optionally, at least one pigment is well dispersed in an aqueous medium under high shear such as is afforded by a COWLES mixer or, in an alternative, at least one predispersed pigment may be used. Then the aqueous emulsion copolymer is added under low shear stirring along with other coatings adjuvants as desired. Alternatively, the aqueous emulsion copolymer may be included in the optional pigment dispersion step. The aqueous composition may contain conventional coatings adjuvants such as, for example, tackifiers, emulsifiers, coalescing agents, buffers, neutralizers, thickeners or rheology modifiers, humectants, wetting agents, biocides, plasticizers, antifoaming agents, colorants, waxes, and anti-oxidants. The aqueous stain-blocking coating composition, in addition to the aqueous emulsion copolymer described herein, may also contain one or more additional polymers, preferably additional emulsion polymers, not containing strong acid monomer as a copolymerized unit; such additional polymers may be present at a level of 0–200%, by weight based on the weight of the aqueous emulsion copolymer.

The solids content of the aqueous stain-blocking coating composition may be from about 10% to about 70% by volume. The viscosity of the aqueous composition may be from 0.05 to 10 Pa.s (50 cps to 10,000 cps), as measured using a Brookfield viscometer; the viscosities appropriate for different application methods vary considerably.

The aqueous composition may applied by conventional application methods such as, for example, brushing and spraying methods such as, for example, roll coating, doctor-blade application, printing methods, air-atomized spray, air-assisted spray, airless spray, high volume low pressure spray, and air-assisted airless spray.

In the method of this invention the aqueous coating composition is applied to a substrate bearing a stain such as, for example, plastic, wood, metal, primed surfaces, previously painted surfaces, and cementitious substrates on which are disposed markings deposited by aqueous or non-aqueous compositions such as those from marking pens or which contain stain bodies such as tannins where such stains are capable of appearing, to a greater or lesser extent, on the surface of a dry later-deposited coating. Without being bound by mechanism, it is believed that such stains become solubilized or dispersed in wet later-applied coating and migrate sufficiently so as to appear on the surface of a dry later-applied coating, thus defeating one of the objectives of applying the later-applied coating, namely, to hide unsightly stains. The aqueous stain-blocking coating of this invention, when dry, is believed to block and/or lock in the stains so that they cannot appear on the visible surface of a dry-later deposited coating.

The aqueous stain-blocking coating composition coated on the substrate is typically dried, or allowed to dry, at a temperature from 10° C. to 95° C.

The following examples are presented to illustrate the invention and the results obtained by the test procedures.

Abbreviations

BA=butyl acrylate

MMA=methyl methacrylate

EHA=2-ethylhexyl acrylate

STY=styrene

[PEM]=phosphoethyl methacrylate (64 wt % active strong acid monomer)

SDBS=sodium dodecylbenzene sulfonate (Polystep A-16–22)

DI water=deionized water nDDM=n-dodecyl mercaptan

APS=ammonium persulfate

SSF=sodium sulfoxylate formaldehyde

Test Procedures

Marker Stain Blocking

Marker stained coated paper test charts were prepared as follows: The unsealed side of Plain White Charts from the Leneta Company (Form WB) measuring 19.37 cm by 28.58 cm (7⅝ by 11¼ in) were stained with a series of 12 pens and markers (1–6 lines per pen or marker). The pens and markers were selected to provide for a range of inks that varied widely in water solubility and included Sanford Black Permanent Marker, PaperMate Red Flair, Red Pilot Razor Point, and Blue Crayola Washable Marker. Aqueous coating compositions were applied to the above marker stained charts using a 3 mil Bird draw-down blade. 2 or 3 paints were drawn down in parallel perpendicular to the applied marker lines. After drying for 2 hrs. in the lab, a 6 mil Bird topcoat of a commercial interior satin latex paint was applied. After drying at least a day paints were rated for stain blocking. Rating is on a 1 to 10 scale with 10 being 100% blocking of all the stains and 1 being almost no blocking (10% or less) of the stains.

Tannin Stain Blocking

Staining substrates, planed and sanded dark-staining Cedar and Redwood, were used in this test. Boards were chosen with a consistent grain pattern across the length of the board to avoid variability in the test. Each test panel was divided into equal sections and test primers were applied by brush to equal spread rate determined by weighing of the paint (~450 square feet per gallon). Paints were allowed to dry ~2 hours. A topcoat paint, which was known to permit the passage of tannins, was applied across the entire panel at ~450 square feet per gallon spread rate. The boards were immediately placed into a sealable, 12 cubic foot humidity chamber. One half hour before placing the boards into the chamber, the chamber was prepared by placing 3 gallons of hot tap water (35°–45° C.) into it to create humidity. The boards were supported 3 inches above the water, face-up and allowed to remain there for 16 hours. The boards were then removed and allowed to dry at lab conditions for at least 24 hours.

The panels were then rated for stain blocking in two ways:

1) Qualitatively, on a scale of 1 to 10 with a 10 rating being 100% tannin blocking and a 1 rating being 10% tannin blocking. In this method, 1 unit is considered significant.

2) Spectrophotometrically, by taking L*a*b readings using a Byk-Gardner Color Sphere. Readings were taken in triplicate. b values are most important. Less-positive "b" values indicate better tannin stain blocking performance. L values, measuring whiteness, are also important. Higher or more positive L values indicate better tannin stain blocking performance. In this method 0.5 unit is considered significant for b and L values.

EXAMPLE 1

Preparation of Aqueous Emulsion Copolymer

A monomer emulsion (ME)was prepared using 500 g of DI water, 74.35 g of 23 wt. % SDBS, 1110.6 g EHA, 630 g STY, 59.4 [PEM] rinsed with 30.4 g DI water, and 4.5 g nDDM rinsed with 5 g DI water. A five-liter, 4-neck round bottom flask containing an initial charge of 900 g DI water and 7.83 g 23 wt. % SDBS was heated to 60° C. under nitrogen sweep. An aliquot of ME (120.6 g) was added to the flask followed by the addition of 24 g 0.15% aq. ferrous sulfate, 0.5 g APS dissolved in 9.0 g DI water and 0.475 g SSF dissolved in 12.6 g DI water. After stirring for 15 minutes, the remaining ME is added to the reaction flask at the rate of 11.0 g/min for the first 20 min and then double that rate for 100 min; 4.86g of APS dissolved in 270 g DI water and 5.46 g SSF dissolved in 273.5 g DI water were gradually added to the kettle over 130 min. The temperature of the batch in the kettle was maintained at 60° C. during the addition. When all additions were complete, the reaction was held for an additional 10 minutes at 60° C. 5.76 g 70% t-butyl hydroperoxide dissolved in 27 g DI water, and 2.24 g SSF dissolved in 88.2 g DI water were added gradually over 60 minutes. The reaction was cooled to 50° C.; then 40.5 g 28% ammonium hydroxide was added. Composition and characterization in Table 2.1 below.

EXAMPLES 2–3

Preparation of Aqueous Emulsion Copolymers

The aqueous emulsion copolymers of Examples 2–3 and Comparative Examples A–C were made according to the process of Example 1 with the compositions and resulting pH and wt % solids content as presented in Table 2.1

TABLE 2.1

Compositions and Characterization of Examples 1–3 and Comparative Examples A–C

| Example | Copolymer Composition | Wt % solids | pH |
|---|---|---|---|
| 1 | 61.7 EHA/35 STY/3.3 [PEM] | 44.3 | 8.0 |
| 2 | 63.7 EHA/30 STY/6.5 [PEM] | 44.4 | 7.6 |
| Comp. C | 65.0 EHA/25 STY/10 [PEM] | 44.7 | 7.6 |
| 3 | 68.7 BA/28 MMA/3.3 [PEM] | 44.8 | 7.4 |
| Comp. A | 61.7 EHA/35 STY/3.3 MAA | 44.6 | 7.5 |
| Comp. B | 65.0 EHA/25 STY/10 MAA | 44.6 | 7.4 |

COMPARATIVE EXAMPLE D

Preparation of Comparative Aqueous Emulsion Copolymer

A monomer emulsion was prepared as described in Example 1 except that 66.5 g of 23 wt % SDBS was added in ME. A five-liter, 4-neck round bottom flask containing an initial charge of 900 g DI water and 15.7 g 23% SDBS rinsed with 20.3 g DI water was heated to 85° C. under nitrogen sweep. An aliquot of ME (120.6 g) was added to the flask followed by the addition of 1.19 g APS dissolved in 20.3 g DI water. After stirring for 10 minutes, the remaining ME was added to the reaction flask at the rate of 11.40 g/min for first 10 min then the rate was increased the to double that rate for 100 min. An initiator solution of 4.21 g APS dissolved in 270 g DI water was gradually added to the kettle over 110 minutes. The temperature of the batch in the kettle was maintained at 85° C. during the addition. When all additions were completed, the reaction mixture was held for an additional 10 minutes at 85° C. then cooled to 65° C. 24.3 g 0.15% ferrous sulfate, 5.76 g 70% t-butyl hydroperoxide dissolved in 34.2 g DI water, and 3.24 g SSF dissolved in 88.2 g DI water were added gradually over 60 minutes. The reaction was cooled to 50° C. then 39.6 g 28% ammonium hydroxide was added.

EXAMPLE 4

Preparation of Aqueous Emulsion Polymer

The aqueous emulsion copolymers of Example 4 was made according to the process of Comparative Example D with the exceptions that 58.7 g 23% SDBS was used in the ME and 23.5 g 23% SDBS was added to the flask and 20.7 g 28% ammonium hydroxide was added at the end with the composition and resulting pH and wt % solids content as presented in Table 4.1

TABLE 4.1

Compositions and Characterization of Example 4 and Comparative Example D

| Example | Copolymer Composition | Wt % solids | pH |
|---|---|---|---|
| 4 | 61.7 EHA/35 STY/3.3 [PEM] | 46.3 | 7.3 |
| Comp. D | 61.7 EHA/35 STY/3.3 MAA | 45.8 | 7.7 |

COMPARATIVE EXAMPLE E

Preparation of Comparative Aqueous Emulsion Copolymer

This example was made according to the teaching of U.S. Pat. No. 5,922,410 Example 2, and had the composition 34.5 EHA/62.3 MMA/20.0 AA/1.2 PEM.

EXAMPLE 5

Preparation and Evaluation of Aqueous Compositions for Marker Stain Blocking and Tannin Stain Blocking Aqueous coating compositions were prepared according to the following formulation. Grind: All liquid ingredients were placed in a vessel except for the ammonia. The vessel was placed on a benchtop stirrer and the ammonia was then added to neutralize. The contents were transferred to a COWLES mixer and the dry ingredients added in following order; NATROSOL 250 MHR, TI-PURE R-706, SNOWFLAKE and ATTAGEL 50. Letdown: The aqueous emulsion polymer was added to the grind. At this point, the compositions became very viscous and most of the letdown water was added followed by TEXANOL, DREWPLUS L-475, ACRYSOL RM-2020, ammonia, ACRYSOL RM-8W, and water.

TABLE 5.1

Formulation ingredients used in aqueous coating composition

| Material Name | grams |
|---|---|
| Grind | |
| Water | 24.94 |
| Propylene Glycol | 17.47 |
| TAMOL 2001 | 5.26 |
| Ammonia (28%) | 0.72 |
| DREWPLUS L-475 defoamer | 0.48 |
| NATROSOL 250 MHR hydroxyethyl cellulose | 0.25 |
| ATTAGEL 50 | 0.50 |
| TI-PURE R-706 titanium dioxide | 82.49 |
| SNOWFLAKE calcium carbonate | 82.03 |
| LetDown | |
| Aqueous emulsion polymer (Comp. A) | 221.80 |
| TEXANOL | 3.96 |
| Drewplus L-475 defoamer | 1.00 |
| Acrysol RM-2020 NPR | 6.22 |
| Acrysol RM-8W | 0.52 |
| Water | 86.12 |
| Ammonia (28%) | 2.10 |

ACRYSOL and TAMOL are trademarks of Rohm and Haas Company; TEXANOL is a trademark of Eastman Chemical Co.; TI-PURE is a trademark of E. I. DuPont DeNemours Co.; NATROSOL is a trademark of Aqualon Div., Hercules Inc..; DREWPLUS is a trademark of Drew Industrial Div., Ashland Chemical Ind.
Coated samples were prepared and evaluated according to the Marker Stain Blocking test described above; results are presented in Table 5.2

TABLE 5.3

Evaluation of dry aqueous coating compositions for tannin stain blocking over cedar

| Sample | L* | a* | b* | Visual |
|---|---|---|---|---|
| Comp. A | 95.4208 | −0.9232 | 1.6406 | 7 |
| | 95.4673 | −0.8448 | 2.1546 | |
| | 95.4706 | −0.9101 | 1.733 | |
| Comp. B | 95.2693 | −0.8549 | 2.1627 | 7 |
| | 95.3136 | −0.8946 | 2.4516 | |
| | 94.4689 | −0.7937 | 2.034 | |
| 1 | 95.9026 | −0.8172 | 2.0586 | 8 |
| | 95.7474 | −0.7538 | 2.0025 | |
| | 95.9274 | −0.7867 | 2.0452 | |
| 2 | 96.059 | −0.8553 | 2.0143 | 8 |

TABLE 5.3-continued

Evaluation of dry aqueous coating compositions for tannin stain blocking over cedar

| Sample | L* | a* | b* | Visual |
|---|---|---|---|---|
| | 96.158 | −0.8626 | 2.1223 | |
| | 96.1273 | −0.8519 | 2.174 | |
| Comp. C | 94.7527 | −0.2153 | 5.4336 | 5 |
| | 93.9145 | −0.1688 | 5.6458 | |
| | 94.5969 | −0.2721 | 5.4002 | |
| 3 | 96.106 | −0.9083 | 2.8128 | 7 |
| | 95.8614 | −0.884 | 2.775 | |
| | 96.1576 | −0.8252 | 2.2575 | |
| Comp. D | 95.7323 | −0.8014 | 1.9482 | 8 |
| | 95.7816 | −0.7909 | 1.8825 | |
| | 95.6129 | −0.8139 | 1.798 | |
| 4 | 95.9671 | −0.7979 | 1.8398 | 8 |
| | 95.4621 | −0.8921 | 1.7429 | |
| | 96.0717 | −0.7659 | 1.5645 | |
| Comp. E | 89.5124 | 0.2879 | 7.4817 | 2 |
| | 90.5356 | 0.0396 | 7.0006 | |
| | 89.7583 | 0.3024 | 7.5875 | |

Note:
The dried aqueous compositions of this invention containing the aqueous emulsion polymers of Examples 1–4 exhibit equal or superior tannin stain blocking over cedar relative to the dried aqueous compositions containing the aqueous emulsion polymers of Comparative Examples A–E.

TABLE 5.4

Evaluation of dry aqueous coating compositions for tannin stain blocking over redwood

| Sample | L* | a* | b* | Visual |
|---|---|---|---|---|
| Comp. A | 94.9066 | −0.8608 | 2.0577 | 9 |
| | 95.0309 | −0.8395 | 2.1452 | |
| | 95.2434 | −0.8453 | 2.0657 | |
| Comp. B | 94.27 | −0.8354 | 2.549 | 8 |
| | 94.5856 | −0.8024 | 2.9917 | |
| | 94.0048 | −0.8721 | 2.3532 | |
| 1 | 95.2008 | −0.7634 | 2.2072 | 9 |
| | 95.3909 | −0.7737 | 2.2813 | |
| | 95.4821 | −0.7576 | 2.0618 | |
| 2 | 95.3498 | −0.7252 | 2.4019 | 8 |
| | 95.2473 | −0.7703 | 2.4145 | |
| | 95.1947 | −0.7958 | 2.416 | |
| Comp. C | 93.9972 | −0.4746 | 6.9825 | 5 |
| | 93.9241 | −0.4872 | 7.2337 | |
| | 93.8206 | −0.3811 | 6.9521 | |
| 3 | 94.5669 | −0.7384 | 2.8889 | 7 |
| | 94.7299 | −0.7456 | 3.0062 | |
| | 94.5763 | −0.7682 | 3.085 | |
| Comp. D | 95.3528 | −0.8963 | 2.0134 | 8 |
| | 95.2189 | −0.9148 | 1.9447 | |
| | 95.0688 | −0.911 | 1.8305 | |
| 4 | 95.6765 | −0.7646 | 2.0677 | 9 |
| | 95.737 | −0.7901 | 2.2324 | |
| | 94.872 | −0.7897 | 2.2071 | |
| Comp. E | 91.2252 | −0.073 | 4.4969 | 3 |
| | 90.305 | −0.2228 | 4.3555 | |
| | 91.5274 | −0.2635 | 4.5052 | |

Note:
The dried aqueous compositions of this invention containing the aqueous emulsion polymers of Examples 1–4 exhibit equal or superior tannin stain blocking over redwood relative to the dried aqueous compositions containing the aqueous emulsion polymers of Comparative Examples A–E.

EXAMPLE 6

Preparation and Evaluation of Aqueous Compositions for Marker Stain Blocking and Tannin Stain Blocking The aqueous emulsion polymer of Comparative Example E appeared to have been under-coalesced in the evaluations of Example 5, so the evaluations of Example 5 were repeated with the exception that the aqueous coating composition containing Comparative Example E only was reformulated to contain 20% by weight, based on emulsion polymer solids, TEXANOL coalescent rather than 4% as had been the case in the evaluations in Example 5. Aqueous coating compositions containing the aqueous emulsion polymer 1 and Comparative A were formulated exactly as in Example 5.

TABLE 6.1

Evaluation of dry aqueous coating compositions for marker stain blocking

| Aqueous Emulsion | Marker Stain Blocking | |
|---|---|---|
| Polymer Ex. 1 | 9+ | 9 |
| Comp. A | 7 | 7 |
| Comp. E | 2 | 2 |

Note:
The results in each column under the heading "Marker Stain Blocking" are from independent tests. The dried aqueous compositions of this invention containing the aqueous emulsion polymer of Example 1 exhibits superior marker stain blocking relative to the dried aqueous compositions containing the aqueous emulsion polymers of Comparative Examples A and E.

TABLE 6.2

Evaluation of dry aqueous coating compositions for tannin stain blocking over cedar

| Sample | L* | a* | b* | Visual |
|---|---|---|---|---|
| Comp. A | 93.8113 | −0.7633 | 3.051 | 8 |
|  | 95.0206 | −0.7698 | 2.4389 |  |
|  | 94.6192 | −0.7903 | 2.775 |  |
| 1 | 94.7496 | −0.5248 | 3.121 | 8+ |
|  | 95.8486 | −0.5353 | 2.4396 |  |
|  | 95.5944 | −0.6348 | 2.6209 |  |
| Comp. E | 94.3259 | −0.9043 | 2.7235 | 7+ |
|  | 94.8671 | −0.9091 | 2.5289 |  |
|  | 95.337 | −0.8411 | 2.2034 |  |
| Comp. A | 95.2977 | −0.8037 | 1.9765 | 8 |
|  | 95.1598 | −0.8359 | 2.1363 |  |
|  | 95.7481 | −0.7376 | 2.0731 |  |
| 1 | 94.7848 | −0.6666 | 2.2909 | 8+ |
|  | 95.6625 | −0.763 | 2.1431 |  |
|  | 95.7374 | −0.7498 | 2.3364 |  |

TABLE 6.2-continued

Evaluation of dry aqueous coating compositions for tannin stain blocking over cedar

| Sample | L* | a* | b* | Visual |
|---|---|---|---|---|
| Comp. E | 93.2879 | −1.0422 | 2.9646 | 7+ |
|  | 95.0883 | −0.8464 | 2.3068 |  |
|  | 95.5039 | −0.8016 | 2.4143 |  |

Note:
The dried aqueous composition of this invention containing the aqueous emulsion polymer of Example 1 exhibits superior tannin stain blocking over cedar relative to the dried aqueous compositions containing the aqueous emulsion polymers of Comparative Examples A and E.

TABLE 6.3

Evaluation of dry aqueous coating compositions for tannin stain blocking over redwood.

| Sample | L* | a* | b* | Visual |
|---|---|---|---|---|
| Comp. A | 92.3879 | −0.6395 | 2.1411 | 7 |
|  | 92.6534 | −0.6956 | 2.2246 |  |
|  | 92.7336 | −0.6958 | 2.2389 |  |
| 1 | 94.1644 | −0.5959 | 2.3508 | 9 |
|  | 94.2449 | −0.6015 | 2.3156 |  |
|  | 93.6738 | −0.6216 | 2.2413 |  |
| Comp. E | 89.4605 | −0.1327 | 3.9795 | 5 |
|  | 91.7752 | −0.4404 | 3.7803 |  |
|  | 90.8434 | −0.4212 | 3.584 |  |
| Comp. A | 91.2589 | −0.5298 | 2.6129 | 6 |
|  | 92.9968 | −0.6928 | 2.0753 |  |
|  | 90.3761 | −0.5599 | 2.7225 |  |
| 1 | 93.5912 | −0.6199 | 2.1767 | 8 |
|  | 94.1032 | −0.4465 | 2.4706 |  |
|  | 93.4389 | −0.5654 | 2.3725 |  |
| Comp. E | 88.6172 | −0.1101 | 4.008 | 4 |
|  | 89.1662 | −0.2112 | 3.8964 |  |
|  | 88.2467 | −0.2502 | 3.7824 |  |

Note:
The dried aqueous composition of this invention containing the aqueous emulsion polymer of Example 1 exhibits equal or superior tannin stain blocking over redwood relative to the dried aqueous compositions containing the aqueous emulsion polymers of Comparative Examples A and E.

What is claimed is:
1. A method for blocking stains comprising
  (a) forming an aqueous coating composition consisting essentially of an aqueous emulsion copolymer, said copolymer having a glass transition temperature (Tg) from −20° C. to 60° C. and said copolymer comprising as polymerized units at least one ethylenically unsaturated nonionic monomer and 1.5–6%, by weight based on the dry weight of said copolymer, ethylenically unsaturated strong acid monomer, or salts thereof;
  (b) applying said aqueous composition to a substrate bearing a stain; and
  (c) drying, or allowing to dry, said aqueous composition.
2. The method of claim 1 wherein said aqueous coating composition further comprises at least one pigment.
3. The method of claim 1 wherein said strong acid monomer is a phosphorous-containing monomer.
4. The method of claim 1 wherein said stain is a marker or ink stain.

* * * * *